Sept. 7, 1965

W. A. GENERKE 3,204,920

VALVE OPERATOR

Filed Jan. 9, 1962

INVENTOR
William A. Generke

BY *Strauch, Nolan & Neale*

ATTORNEYS

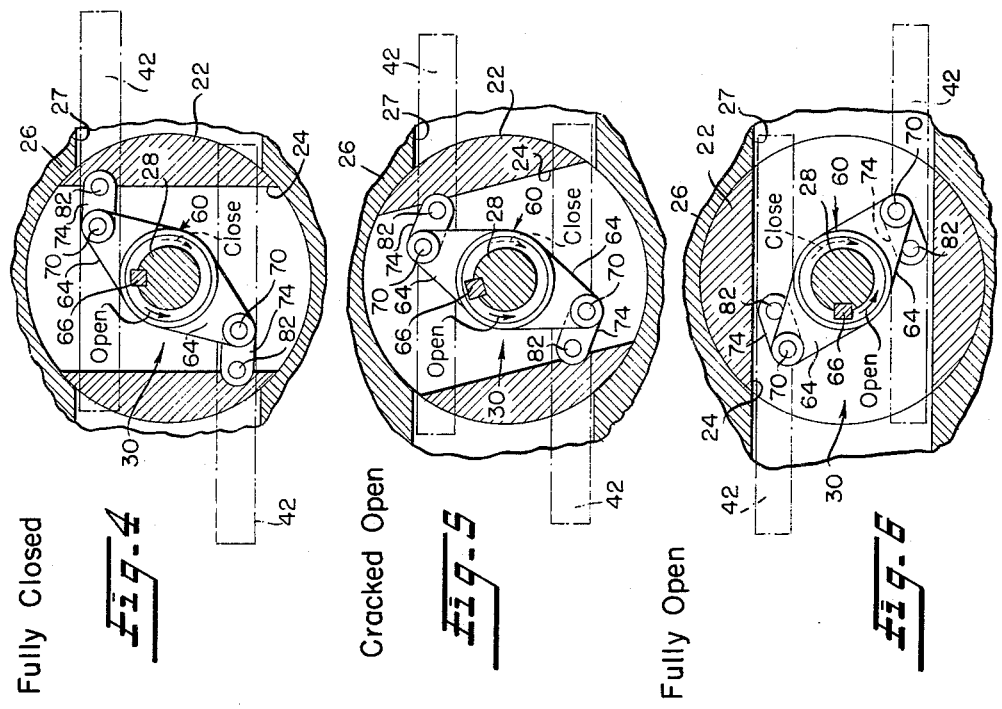
Fig. 4 Fully Closed
Fig. 5 Cracked Open
Fig. 6 Fully Open
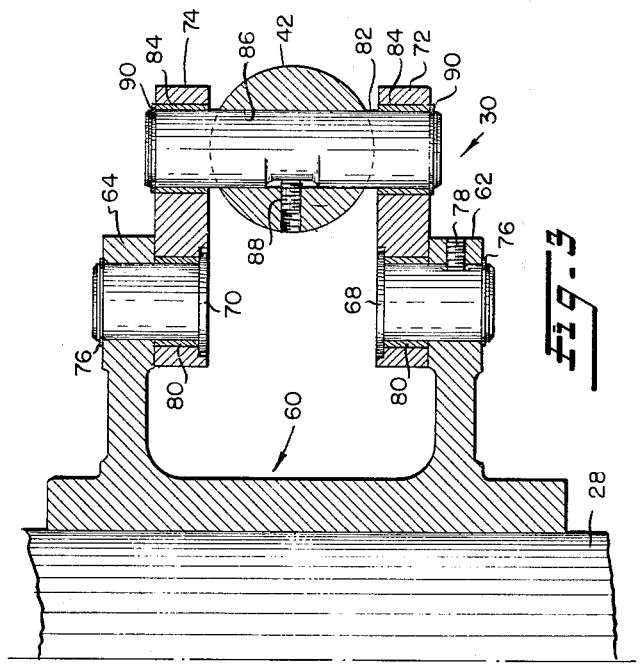
Fig. 3
INVENTOR
William A. Generke
ATTORNEYS

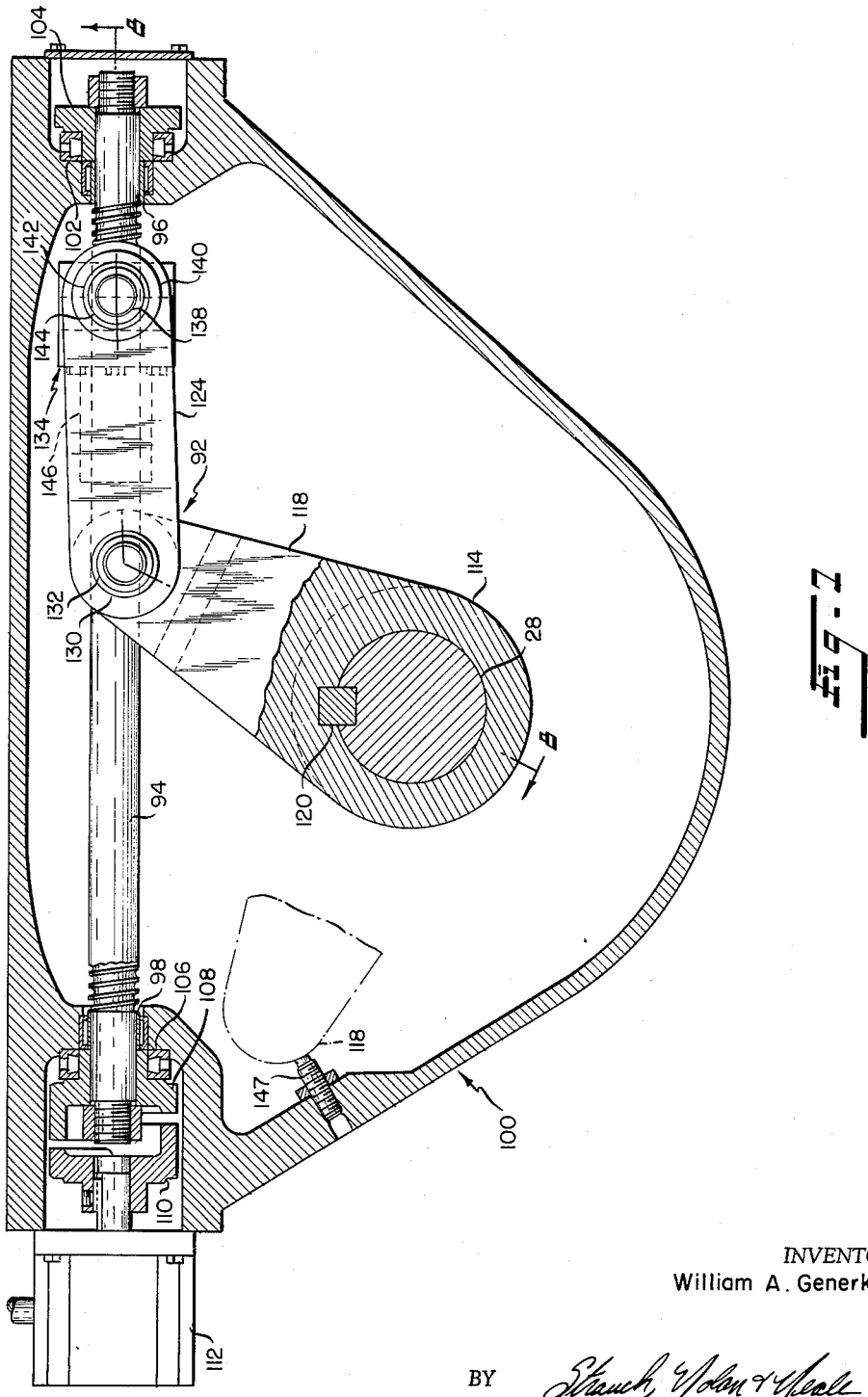

Sept. 7, 1965  W. A. GENERKE  3,204,920
VALVE OPERATOR

Filed Jan. 9, 1962  5 Sheets-Sheet 5

INVENTOR
William A. Generke

BY  *Strauch, Nolan & Neale*

ATTORNEYS

United States Patent Office 3,204,920
Patented Sept. 7, 1965

3,204,920
VALVE OPERATOR
William A. Generke, Wadsworth, Ohio, assignor to Rockwell Manufacturing Company, Pittsburgh, Pa., a corporation of Pennsylvania
Filed Jan. 9, 1962, Ser. No. 165,120
7 Claims. (Cl. 251—58)

This invention relates to valve operators and, more specifically, to valve operators for rotary plug valves.

Valves of the type to which this invention has particular application may have ports ranging, for example, from twelve to thirty-six inches in diameter. Obviously, torque forces of high magnitude are required to open and close such valves. For example, a maximum torque of 198,000 inch-pounds is required to open and close a 20 inch lubricated ball valve which is typical of the valves with which this invention is concerned.

Rotary valves of this type are normally not used for throttling purposes but are rotated through an arc of 90° to either a fully closed or a fully open position to prohibit or permit fluid flow through the line in which the valve is disposed. Preferably, as a valve plug in this type of valve is rotated from the closed to the open position, the valve plug port remains out of communication with the valve body passages as the valve plug is rotated through the first 15° or so of its travel. Then, at this point, the valve "cracks open." The valve reaches its fully open position when the plug has been rotated 90° from its fully closed position.

It has been found that the torque required to open a valve of this type is not uniform. On the contrary, the torque required to move the valve plug increases continuously as the plug is rotated from the closed position to the position where it cracks open, reaching a maximum at this position. Thereafter, the required valve-opening torque drops sharply and then remains substantially constant at a considerably lower level as the valve plug completes its travel to the open position.

It is a major purpose of the present invention to provide for this type of valve a valve operator having a variable torque output which will substantially match the torque required by the valve. The operator constructed in accordance with this invention therefore may be closely matched to the size valve with which it is to be employed.

However, prior attempts to achieve this result have involved redesign of the valve. A typical proposal of this type is shown in United States Patent No. 2,809,011 which employs not only a variable torque operator, but, in addition, a rotary valve member constructed so that it may be unwedged, or lifted, from its seat when torque is applied to the valve to open it. In this type of valve, the valve plug is unwedged and cracks open when it has rotated through but about 3°. Consequently, the valve plug remains in sealing engagement with its seat through not more than this same 3° angle. For this type of valve to function properly, both the valve plug and valve seat must either be manufactured to extremely close tolerances or a complex flexible valve seat must be provided. Flexible seats are undesirable since the valve must be made more complex to prevent the seat from vibrating. Moreover, a complicated construction must be provided to accomplish the unwedging action. In addition, this type of valve is extremely sensitive to thermal change, mere changes in ambient temperature being sufficient to alter the close tolerances which must be maintained if the valve is to operate properly. This problem may also be overcome by employing a flexible valve seat but again this is a complex, expensive solution.

Again, such valves are susceptible to erosion resulting from the deposition of minute particles of foreign matter between the valve and its seat. Because of the extremely small area of engagement between the surfaces of the valve and its seat, once the smallest discontinuity is established, these members will be quickly eroded to the point where the valve will be useless.

Valves of this type commonly employ a valve operator having a toggle mechanism between the source of power, and the valve plug to apply valve-operating torque to the latter. It has not been recognized in the prior art, however, that a toggle mechanism may be employed to achieve the desired results without corresponding redesign of the valve structure.

Though the foregoing discussion has been conducted solely with reference to the valve-opening problem it is to be understood that the same problem obtains upon valve-closing operation. That is to say, in moving a valve plug of the type described above from the fully open to the fully closed position, a substantially uniform, low level torque input to the valve is required until the valve reaches the position of minimum flow, this being the position where it is barely cracked open. At this point, the torque required increases rather sharply to a maximum. Thereafter, the torque required to move from the cracked open position to the fully closed position decreases continuously.

With the foregoing considerations in mind the objects of this invention include:

(1) The provision of improved valve operators for large-port rotary plug valves of the type wherein the plugs remain in sealing and liquid flow preventing engagement with their valve seats for a substantial portion of the distance they travel from the closed position toward the open position;

(2) The provision of improved valve operators for large-port rotary valves which eliminate the need for additional valve unwedging or unsealing mechanism;

(3) The provision of improved valve-valve operator assemblies comprising large-port rotary valve assemblies having valve plugs which, when moved from the fully closed to the fully opened position, remain in sealing and flow preventing engagement with their seats throughout a first and substantial portion of such movement at the end of which portion they crack open, and operators having variable torque outputs which reach maximums when the valves reach their cracked open positions;

(4) The provision of improved valve-valve operator assemblies comprising large-port rotary plug valve assemblies wherein the torques required to move the plugs from the closed to the open position increases, reaching a maximum as the valves crack open, and then decreases and remains at substantially uniform minimum; and valve operators having torque outputs varying in substantially the same manner; and, (5) The provision of improved valve regulators for large-port rotary plug valves which allow the use of simpler valves having components manufactured with broader tolerances than has heretofore been possible.

Further novel features and other objects of this invention will become apparent from the following detailed description, discussion and the appended claims taken in conjunction with the accompanying drawings showing preferred structures and embodiments in which:

FIGURE 3 is a view of the toggle mechanism taken substantially along line 3—3 of FIGURE 2;

FIGURE 4 is a partly schematic view of a rotary valve equipped with a toggle action valve operator constructed in accordance with the present invention and shows the disposition of the components of the toggle mechanism when the valve is in the closed position;

FIGURE 5 is a view similar to FIGURE 4 showing the configuration of the toggle mechanism when the valve has been rotated counterclockwise to the position where it is cracked open;

FIGURE 6 is a view similar to FIGURES 4 and 5 showing the configuration of the toggle mechanism when the valve is in the fully open position;

FIGURE 7 is a horizontal section, taken substantially along line 7—7 of FIGURE 8, of a modified valve operator wherein the toggle mechanism is operated by a rotatable lead screw and follower arrangement; and, FIGURE 8 is a sectional view of the valve operator of FIGURE 7 taken substantially along line 8—8 of FIGURE 7.

Figure 1:
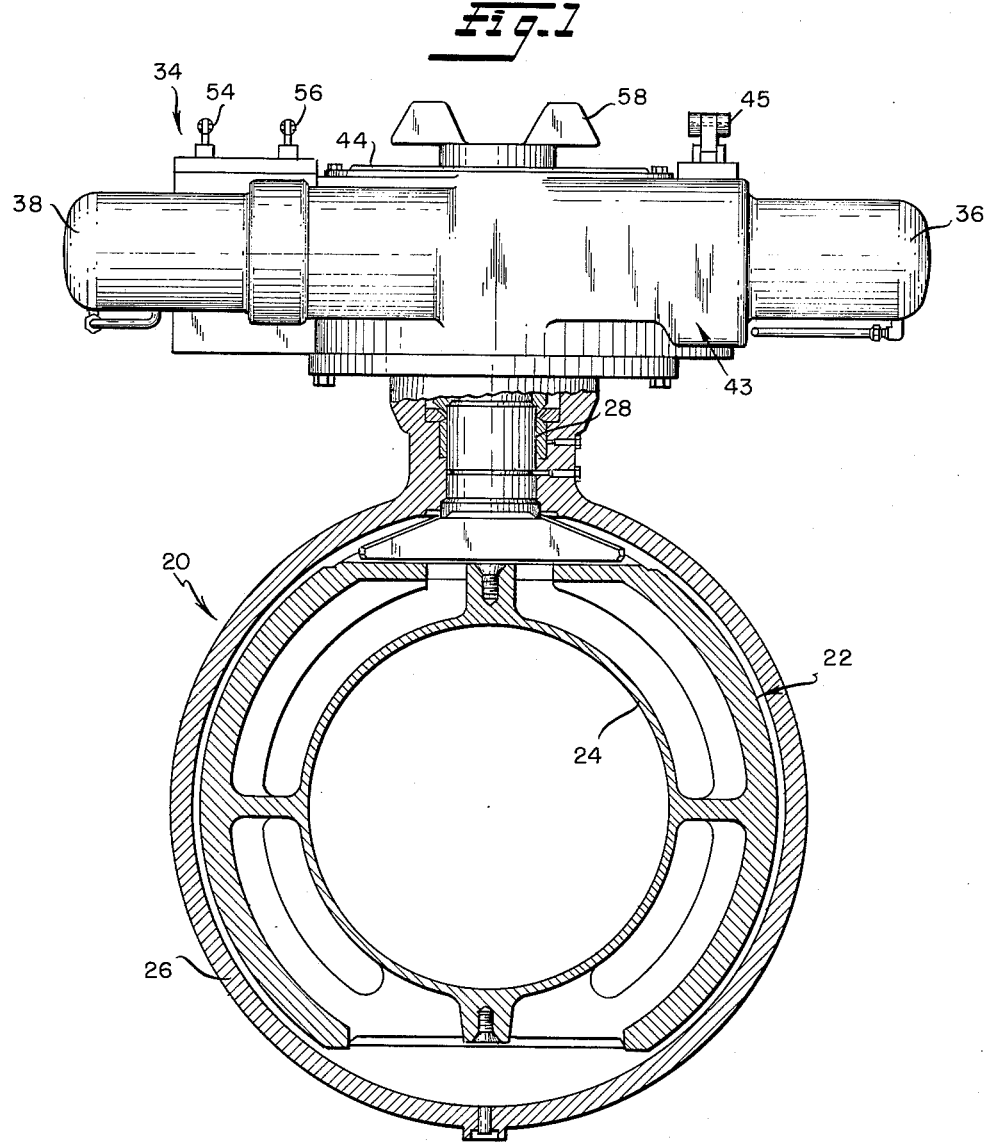
FIGURE 1 is an elevational view, partly in section, of a large-port rotary plug valve assembly incorporating a toggle action valve regulator constructed in accordance with the present invention and operated by a hydraulic or pneumatic motor and is taken substantially along line 1—1 of FIGURE 2.

Referring now to the drawings, FIGURE 1 illustrates a large-port rotary valve assembly 20 equipped with a toggle action valve operator constructed in accordance with the principles of the present invention. A rotary valve plug 22 having a through port 24 is mounted within a valve casing 26 for rotation through a 90° arc between open and closed position. As is shown in FIGURE 6, when valve plug 22 is in the open position through port 24 is aligned with passage 27 in valve casing 26 to permit fluid flow therethrough. Conversely, when plug 22 is in the closed position (FIGURE 4), flow through passage 27 is interrupted. Valve plug 22, which is shown in the open position in FIGURE 1, is rotatable by an upwardly extending valve stem 28.

Figure 2:
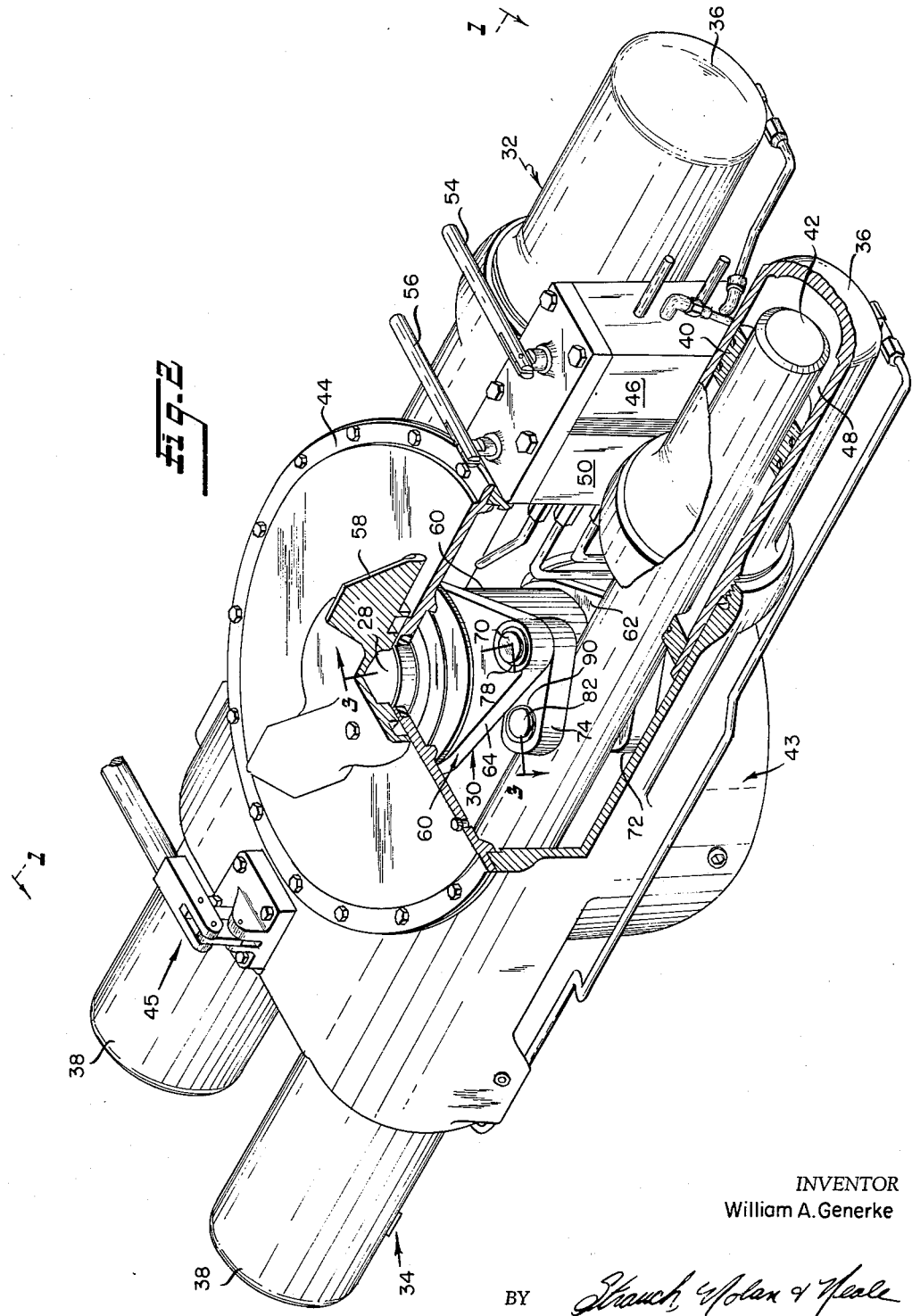
FIGURE 2 is a perspective view of the valve operator shown in FIGURE 1 with a portion of the valve operator housing broken away to show the toggle mechanism.
Figure 9:
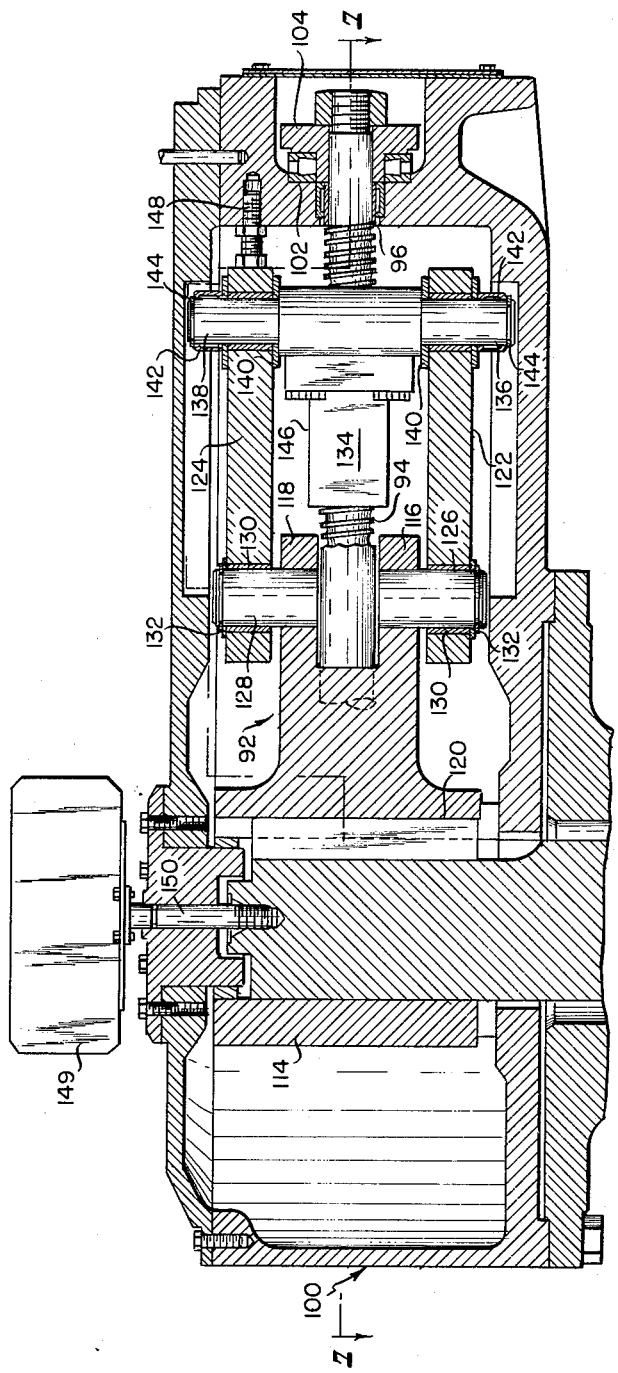

As is shown in FIGURES 2, 3, and 4, valve stem 28 is rotated, through a toggle mechanism 30, by a pair of coacting servomotors 32 and 34. Each of the servomotors 32 and 34 consists of a pair of axially spaced apart cylinders 36 and 38 having pistons 40 disposed therein. Connected between the two pistons 40 in each servomotor is an axially reciprocable piston rod 42. The cylinders 36 of servomotors 32 and 34 are threaded into or otherwise secured to the valve operator housing 43 with piston rods 42 being disposed inside the housing. Valve operator casing 43 is closed by a cover plate 44 which may be removed to gain access to the valve operator mechanism.

FIGURE 2 shows the position of the piston rod 42 in servomotor 34 when the valve plug 22 is in the fully open position (see also FIGURE 6). Hydraulic fluid may be pumped by a hand pump 45 from a reservoir (not illustrated) in the operator housing through a four-way valve 46 to a chamber 48 in the cylinder 36 of servomotor 34 to move piston rod 42 in motor 34 to the left, rotating valve plug 22 clockwise from the open position of FIGURES 2 and 6 to the closed position of FIGURE 4. To eliminate side thrust and, therefore, bending stresses on valve stem 28, hydraulic fluid is pumped to a similar chamber (not illustrated) in cylinder 38 of servomotor 32. To open the valve, substantially the same procedure is followed, hydraulic fluid being pumped to the corresponding chambers in cylinder 38 of servomotor 34 and cylinder 36 of servomotor 32 to move piston rod 42 of servomotor 34 to the right and the piston rod of servomotor 32 to the left. Valve plug 22 is thereby rotated counterclockwise from the closed position of FIGURE 4 to the open position of FIGURES 2 and 6.

An alternate method is provided for opening and closing valve plug 22. Pressurized air or gas may be taken directly from the pipeline in which the valve is installed (or from a compressor or storage tank) and piped through a filter and a lubricator (not illustrated) and a four-way valve 50 to chamber 48 in cylinder 36 of servomotor 34 and to the corresponding chamber in cylinder 38 of servomotor 32. This will move piston rod 42 to the left, rotating valve 22 from the open position of FIGURE 6 to the closed position of FIGURE 4 and, as in the previous mode of operation, this prevents bending stresses on valve stem 28. The valve plug 22, in this mode of operation, is opened by pumping the air or gas to the corresponding chambers in cylinder 38 of servomotor 32 and cylinder 36 of servomotor 34. Control levers 54 and 56 are provided for operating four-way valves 46 and 50. The valve operator may be provided with an indicator 58 rotatively fixed to the upper end of valve stem 28 to indicate the position of the valve plug 22. The foregoing control system is a separate invention and forms no part of the present invention. In essence, its operation is the same as the control system disclosed in United States Letters Patent No. 3,056,573 issued October 2, 1962 assigned to the assignees of the present invention.

The toggle mechanism 30 connecting the piston rods 42 in servomotors 32 and 34 to valve stem 28 and the correlation of the toggle mechanism with the power source and the valve plug are particularly important features of the invention. Toggle mechanism 30 consists of two symmetrically disposed linkage arrangements (see FIGURES 4–6). A crank 60 having pairs of vertically spaced apart, radially extending, symmetrically disposed arms 62 and 64 surrounds the upper end of valve stem 28 and is fixed to it by an elongated key 66 (see FIGURES 4 to 6). Pivotally mounted adjacent the outer ends of each pair of crank arms 62 and 64 by pivot studs 68 and 70 are a pair of elongated links 72 and 74. Pivot studs 68 and 70 may be fixed to crank arms 62 and 64 by lock washers 76 and set screws 78. Sleeve bearings 80 may be interposed between pivots 68 and 70 and the associated crank arms 62 and 64 to reduce wear and insure smooth operation.

One pair of links 72 and 74 is pivotally connected to piston rod 42 of servomotor 34 by a pin 82 which is journalled in sleeve bearings 84 disposed in the links 72 and 74 and which extends through a transverse bore 86 in piston rod 42. Setscrew 88 and lock washers 90 retain pin 82 in its proper position. The symmetrically opposite links 72 and 74 of toggle mechanism 30 are connected in like manner to the piston rod 42 of servomotor 32.

The manner in which the variable torque output is produced by the novel toggle mechanism 30 can best be understood by reference to FIGURES 4 to 6. To move valve plug 22 from the fully closed position (FIGURE 4) to the cracked open position (FIGURE 5) requires the application to valve stem 28 of a continously increasing torque. In moving between these two positions, a typical valve of the category with which this invention is concerned will rotate through an angle of about 15°. For a typical 20 inch rotary valve, the necessary valve-opening torque increases from 100,000 inch-pounds at the fully closed position to 198,000 inch-pounds at the cracked open position, the valve rotating through an arc of 15° in moving between these positions. After the valve is cracked open, the torque required to complete the opening movement of the valve drops sharply to a substantially constant level of about 40,000 inch-pounds.

When valve plug 22 is fully closed, there is an obtuse angle between crank arms 64 and links 74 (in the ensuing discussion only these two components will be referred to since the coaction of crank arms 62 and links 72 is identical) and toggle mechanism 30 exerts a substantially less than maximum torque on valve stem 28 (it being understood that, in actual practice, continuous, substantially uniform, axially directed forces are exerted on piston rods 42). When servomotors 32 and 34 are energized to rotate valve plug 22 from the closed position of FIGURE 4 to the open position of FIGURE 6, the angle between links 74 and crank arms 64 continuously decreases until, at the point where the valve just begins to open, these components are at nearly right angles. As the angle between links 74 and crank arms 64 decreases, the output torque of toggle mechanism 30 and, therefore, the torque exerted on valve stem 28 continuously increases, reaching a maximum when links 74 and crank arms 64 are disposed at nearly right angles to each other. Thus the developed torque is matched with the required torque since the maximum valve-opening torque on valve stem 28 is required as valve plug 22 moves through the cracked open position.

It will be observed from FIGURES 4–6 that each crank arm 64 remains of constant length, and that the changing angular relation of link 74 to crank arm 64 produces a changing component of the linear force derived from piston rod 42 acting to turn crank arm 64. The angle between link 74 and the direction of applied force by piston rod 42 is substantially always acute during the entire 90° turning of the valve.

After valve plug 22 moves through the cracked open position, the angle (now acute) between links 74 and crank arms 64 continues to decrease, reaching a minimum when valve plug 22 approaches the fully open position of FIGURE 6. After links 74 and crank arms 64 pass the point where they are disposed at right angles to each other, the toggle mechanism 30 exerts a decreasing and, later, gradually increasing but always substantially less than maximum torque on valve stem 28. In a typical case, for example for operating the 20 inch valve referred to above, the operator of the present invention develops a torque which varies from about 220,000 inch-pounds to about 310,000 inch-pounds, this maximum torque being developed when the valve plug is just cracked open as shown in FIGURE 5.

FIGURES 7 and 8 illustrate a somewhat different type of valve operator employing a toggle mechanism in accordance with the principles of the present invention. In this modification valve stem 28 is rotated, through a toggle mechanism 92, by a lead screw 94 which may be rotated by any suitable manual, hydraulic, pneumatic, electric, or other power means. Lead screw 94 is rotatively journalled in sleeve bearings 96 and 98 disposed in the side walls of the valve operator housing 100. A thrust bearing 102 and a thrust collar 104 prevent lead screw 94 from moving axially to the left; a thrust bearing 106 and a ball screw coupling 108 prevent it from moving axially to the right. Ball screw coupling 108 is connected through a speed reducer coupling 110 to a speed reducer 112, the latter being connected by suitable mechanism (not illustrated) to the power means.

As in the embodiment of FIGURES 1 to 6 a particularly important feature of the valve operator is the arrangement of the toggle mechanism 92 connected between valve stem 28 and lead screw 94. An asymmetrical crank 114 having a pair of vertically spaced apart arms 116 and 118 is rotatively fixed to the upper end of valve stem 28 by an elongated key 120. A pair of elongated links 122 and 124 are pivotally connected to the outer ends of crank arms 116 and 118 by pivot studs 126 and 128 disposed in sleeve bearings 130 in the links and secured in place by lock washers 132.

The opposite ends of links 122 and 124 are connected by a follower 134 to lead screw 94. Oppositely extending cylindrical end portions 136 and 138 of follower 134 are journalled in sleeve bearings 140 disposed in links 122 and 124. Bearing assemblies 142 surround the ends of cylindrical follower portions 136 and 138 and are fastened in place by retaining rings 144. The main body portion 146 of follower 134 is in threaded engagement with lead screw 94. Thus, as lead screw 94 is rotated, follower 134 moves axially along it and, acting through toggle mechanism 92, rotates valve plug 22 between the open and closed positions.

When valve plug 22 is in the closed position, toggle mechanism 92 is in the full line position of FIGURE 7. When valve plug 22 is rotated to the open position, toggle mechanism 92 will move until crank arm 118 is in the position shown in phantom outline in the same figure. Setscrews 147 and 148, threaded in valve operator housing 100, limit the movement of crank 114.

The valve operator may be provided with conventional position limit and/or torque limit switches (not illustrated) to deactivate the power means when crank arm 118 engages setscrew 147 (the open position) and setscrew 148 (the closed position). An indicator 149 may be attached to the upper end of valve stem 28 by a threaded fastener 150 to provide an external indication of the position of valve plug 22.

Toggle mechanism 92 operates in the same manner as the toggle mechanism 30 employed in the embodiment of the valve operator illustrated in FIGURES 1 to 6, developing a continuously increasing output torque as the valve moves from the fully closed to the cracked open position, this torque reaching a maximum when the valve is in the latter position and thereafter decreasing as the valve rotates from the cracked open to the fully open position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The combination of a valve having a stem operated rotary plug, said plug being rotatable from a first fully closed position through a second minimum-flow-establishing position to a third fully open position and requiring the application of maximum valve-opening torque as said valve plug moves through said second position; and mechanism for exerting valve-opening torque on the stem of said plug comprising, a first member rigid with said stem and projecting radially outwardly therefrom, a second member pivotally connected adjacent one end thereof to the projecting end of said first member, means pivotally connected to said second member for exerting a force on said second member at a point adjacent the opposite end thereof and arranged to move said point in an essentially linear path as said valve plug moves from said first to said third position, said second member having fixed axis pivot connections to both said first member and said force exerting means and said first and second members being so arranged that they form an obtuse angle therebetween when said valve is in said first position, said angle decreasing as said valve is rotated to said second position whereby continuously increasing torque is exerted on said valve, said members forming an included angle of about 90° when said valve is in said second position to exert maximum torque on said valve, and said members forming a decreasing acute angle therebetween as said valve moves from said second to said third position.

2. The combination of a valve having a plug rotatable about its axis from a first fully closed position through a second minimum-flow-establishing position wherein the valve cracks open to a third fully open position and requiring the application of maximum valve-opening torque as it moves through said second position; and mechanism for exerting valve-opening torque on said valve plug, said mechanism being so constructed and arranged to exert continuously increasing valve-opening torque on said valve plug as the latter moves from said first toward said second positions, said torque becoming a maximum as said valve moves through said second position and then decreasing as said valve moves from said second to said third position.

3. Valve-operating mechanism for a valve having a stem operated rotary plug rotatable from a first fully closed position through a second minimum-flow-establishing position to a third fully open position and requiring continuously increasing valve-opening torque as said plug moves from said first to said second position, maximum valve-opening torque as said plug moves through said second position and subsequent, substantially uniform, valve-opening torque as said plug moves from said second to said third positions, comprising: a first member fixed to said valve stem and adapted to rotate said valve plug, a second member pivotally connected to said first member eccentrically of the axis of rotation of the valve stem, means pivotally connected to said second member for exerting a force on said second member and arranged to move its pivotal connection to said second member in an essentially linear path as said valve plug moves from said first to said third position, said second member having fixed axis pivot connections to both said first member and said force exerting means and said first and second members being arranged to form an obtuse angle therebetween when said valve plug is in said first position, said angle decreasing as said valve plug is rotated to said second position whereby continuously increasing torque is exerted on said valve plug, said members forming substantially a right angle therebetween when said valve plug is in said second position to exert maximum valve-opening torque on said valve plug, said members forming a more acute angle therebetween as said valve plug rotates from said second to said third position.

4. The combination of claim 3, wherein said means for exerting a force on said second member comprises a hydraulic motor, said second member being pivotally attached to the piston of said motor.

5. The combination of claim 3, wherein said means for exerting a force on said second member comprises a threaded shaft, means for rotating said shaft, and a nut threaded on said shaft for movement therealong, said nut being pivotally connected to said second member.

6. The combination of claim 3, including third and fourth members which are mirror images of, and symmetrically disposed about said valve stem with respect to, said first and second members, respectively, whereby said valve-operating mechanism is prevented from exerting bending stresses on said valve stem.

7. In a plug valve assembly of the type wherein a plug is rotatably mounted about a fixed axis in a valve body and has a through port adapted to align with a flow passage in the body in valve open position of the plug and to block said passage in the valve closed position of the plug and a stem for rotating the plug projects through said body, the improvement which comprises a power operator mounted on said body having a reciprocable power driven element, a projecting radial arm rigid with said valve stem, and a link of fixed effective length pivotally connected at opposite ends to said element and the outer end of said arm, said arm and link having controlled changing angular relationship between them as the plug moves between valve closed and open positions, with said arm and link defining an obtuse angle between them when the plug is in valve closed position and moving through a 90° included angle position when the valve is initially cracked open to an increasingly acute angle relationship as the plug moves to fully open valve position, and said link maintaining an acute angular relationship with the direction of applied force by said reciprocable element during substantially the entire movement of said plug between valve open and closed positions.

References Cited by the Examiner
UNITED STATES PATENTS 2,619,943  12/52  Monleone _____ 121—120
2,809,011  10/57  Davis.
3,056,573  10/62  Matheson et al. _____ 251—31

ISADOR WEIL, *Primary Examiner.*

WILLIAM F. O'DEA, *Examiner.*